(12) United States Patent
Powchowicz (10) Patent No.: US 11,310,565 B2
(45) Date of Patent: Apr. 19, 2022

(54) SYSTEM AND METHOD FOR AN IMPROVED, SELECTIVE DOWNLOAD OF BROADCAST DATA

(71) Applicant: ADVANCED DIGITAL BROADCAST S.A., Bellevue (CH)

(72) Inventor: Tomasz Powchowicz, Zielona Gora (PL)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 177 days.

(21) Appl. No.: 16/724,417

(22) Filed: Dec. 23, 2019

(65) Prior Publication Data
US 2020/0359105 A1 Nov. 12, 2020

(30) Foreign Application Priority Data
Dec. 23, 2018 (EP) .................................. 18215817

(51) Int. Cl.
*H04N 21/643* (2011.01)
*H04H 20/28* (2008.01)
*H04N 21/2362* (2011.01)

(52) U.S. Cl.
CPC ...... *H04N 21/64315* (2013.01); *H04H 20/28* (2013.01); *H04N 21/2362* (2013.01)

(58) Field of Classification Search
CPC ......... H04N 21/64315; H04N 21/2362; H04H 20/28; G06F 15/16
See application file for complete search history.

(56) References Cited

U.S. PATENT DOCUMENTS

2009/0292761 A1* 11/2009 Lemmers ........... H04N 21/6433
709/203

* cited by examiner

*Primary Examiner* — Yassin Alata
(74) *Attorney, Agent, or Firm* — Mark M. Friedman (57) ABSTRACT

The invention relates to a system and method for improved, selective download of broadcast data. In particular the present invention relates to downloading of broadcast data effectively when disturbances occur during reception of an input signal comprising a data carousel. The invention introduces multiplication of content filters that are configured to download only a part of the data. An important feature is recognition when to reset content filters in order to resolve an issue. For the purposes of this invention, there is defined a linear address space. The important properties of this address space allow for consistent addressing without gaps and every address is greater by a single position with respect to the previous one. The address space starts with one address and ends with another one. Such chunk address space may be considered as predictable, because a synchronization can be caught by reading an address of currently broadcast section.

10 Claims, 8 Drawing Sheets

| | | |
|---|---|---|
| 300 | Filesystem section | |
| 301 | filesystem_table_id | (8 bits) |
| 302 | section_length | (12 bits) |
| 303 | filesystem_version_number | (5 bits) |
| 304 | section_id | (8 bits) |
| 305 | last_section_number | (8 bits) |
| 306 | N-Files | (var) |
| 310 | | |
| 311 | A file | |
| 312 | file_id | (32 bit) |
| 313 | start address | (32 bit) |
| 314 | end address | (32 bit) |
| 315 | file length | (64 bit) |
| 316 | checksum | (32 bit) |
| | filename | (var) |
| 350 | | |
| 351 | File data section | |
| 352 | file_data_table_id | (8 bits) |
| 353 | section_length | (12 bits) |
| 354 | chunk_id | (24 bits) |
| 355 | file_data_version_number | (5 bits) |
| 356 | section_id | (8 bits) |
| 357 | last_section_number | (8 bits) |
| 358 | file_id | (32 bits) |
| | file data | (var) |

SYSTEM AND METHOD FOR AN IMPROVED, SELECTIVE DOWNLOAD OF BROADCAST DATA

TECHNICAL FIELD

The present invention relates to a system and method for improved, selective download of broadcast data. In particular, the present invention relates to effectively downloading of broadcast data when disturbances occur during reception of an input signal comprising a data carousel.

BACKGROUND OF THE INVENTION

Prior art defines a data delivery via a carousel system, which is in particular implemented in broadcast systems. Errors in signal reception often lead to inefficient downloading of the carousel's content, because such carousel needs to loop several times in order to collect all data. In case of large data carousels, a relatively minor error may lead to a significant delay in obtaining all required data.

Typically, one demultiplexer filter is set up, in order to catch broadcast sections that in turn lead to download of broadcast data from a carousel. This approach however, has a few drawbacks: firstly, a download bitrate can not be decreased without consequences because content may be missed when the filter is disabled. The missed content could only be retrieved at the next attempt of the carousel loop; and secondly, disturbances in downloading data during the first loop of the carousel lead to collecting the same data again during subsequent attempts. The data usually are skipped on the software level (middleware) causing many memory transfers and CPU engagement for dropping sections at the system software level.

It would be advantageous to address the aforementioned drawbacks. Therefore, the aim of the development of the present invention is a system and method for improved, selective download of broadcast data.

SUMMARY AND OBJECTS OF THE PRESENT INVENTION

An object of the present invention is a broadcast signal facilitating selective download of broadcast data at a receiver, said broadcast signal comprising:
a filesystem table comprising:
  a filesystem table identifier that is used to differentiate between tables;
  a section length which specifies the number of bytes of the section;
  a filesystem version number which is used in a receiver to identify whether a change has occurred in with respect to the version stored in the receiver;
  a section identifier applied in distinguishing between sections;
  a last section number denoting a final section of a given filesystem table;
  and a description of N-files wherein every file is represented by a file structure table, which comprises:
    a file identifier that is used to differentiate between files;
    a start and an end address, in a linear address space, denoting which sections have to be retrieved in order to obtain complete file data;
    a file length;
    a checksum;
    a filename;
wherein for each file a content information structure is provided that comprises:
  a file data table identifier allowing to differentiate between file data tables;
  a section length;
  a chunk identifier;
  a file data version number;
  a section identifier;
  a last section number;
  the file identifier;
  content of the file.

Preferably, the data items are delivered a form of DVB Private Data Tables (PDT) while Service Information table mechanism is employed for carrying data as per ETSI EN 300 468.

Preferably, a section address is calculated as follows: section_address=chunk identifier*256+section identifier.

Preferably, each file identifier refers to one file only of a given version.

Preferably, a file data version number shall equal a filesystem version number in order to be assigned to a given filesystem.

Preferably, a chunk is composed of at least one section and a file comprises at least one chunk.

A next object of the present invention is a method for receiving the signal according to the present invention for facilitating selective download of broadcast data at a receiver, said method being characterized in that it comprises the steps of: opening a filesystem filter to collect an identified filesystem table; subsequently, after downloading all sections required to build a filesystem metadata transmitted in the broadcast data, as well as a linear address space, opening a synchronization filter in order to determine sections' addresses that are broadcast; after catching a synchronization determining the next chunks, that will not exceed a maximum download bitrate of the receiver, and opening n-content filters in order to download the determined chunk, and closing said n-content filters; after all chunks have been downloaded, closing the synchronization filter is closed.

Preferably, the method further comprises a step of receiving, during the data download process, a reset signal, which means that the receiver has not received expected data and an error has occurred, wherein in such a case returning the system to the determining step and determining the next chunk to download.

Another object of the present invention is a computer program comprising program code means for performing all the steps of the computer-implemented method according to the present invention when said program is run on a computer.

Another object of the present invention is a computer readable medium storing computer-executable instructions performing all the steps of the computer-implemented method according to the present invention when executed on a computer.

A further object of the present invention is a system for receiving the signal according to the present invention for facilitating selective download of broadcast data at a receiver, said system being characterized in that it comprises: a controller comprising: a Bitrate and Download Unit configured to collect data and manage the download pace; a Filter Selection Unit configured to set up a broadcast signal demultiplexer to pick sections up from a selected transport stream to a Memory; a Content Storage Unit configured to store data received from the Filter Selection Unit and guard data consistency; wherein said controller is configured to execute all steps of the method according to the present invention.

BRIEF DESCRIPTION OF THE DRAWINGS

These and other objects of the invention presented herein, are accomplished by providing a system and method for improved, selective download of broadcast data. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

DESCRIPTION OF EMBODIMENTS

In carousel systems a filesystem is formed at three levels: sections, chunks and files. A chunk is composed of at least one section and a file comprises at least one chunk. In the boundary case, a file could be compromised of one chunk and the chunk of one section.

A basic technical concept of the present invention is introduction of a method of multiplying the number of content filters that are configured to download only a part of the data. Each content filter is responsible for collecting only a part of data, which may be a chunk, a section or a plurality of sections. If a chunk is missed, due to signal disturbance, the content filter needs to be reset and configured to download the next chunk, section or plurality of sections. If such process is not executed, the filter waits for a loop of the carousel for completion.

An important element of the present invention is a method for recognizing when to reset content filters in order to resolve this issue. For the purposes of this invention, there is defined a linear address space. The important properties of this address space allow for consistent addressing without gaps and every address is greater by a single position with respect to the previous one. The linear address space starts with one address and ends with another one. Such chunk address space may be considered as predictable, because a synchronization can be caught by reading an address of currently broadcast section.

If each carousel data section is copied to the memory due to synchronization purposes, the present invention may be reduced to one filter solution. If due to hardware or software constraints, there is not possible reading of section's address only, the whole content of a section needs to be copied to a preallocated buffer (e.g. 4096 bytes). An alternative solution is to read every n-section and check if the content filters shall be rescheduled to the next download.

When a synchronization impulse is triggered, the content filters are checked. If one of them is out of synchronization and stalled on one of the previous section addresses, a process of calculating the nearest matching section address is executed. One of the important factors, during address calculation, is bitrate control. When too many sections were read, in order to maintain download at a threshold bitrate, a range of the nearest sections need to be skipped. That causes a filter reset, not to the nearest section, but to the section that would not cause bitrate overflow. The section shall not be booked by another content filter. If the last condition is not set, the content filters would download the same sections.

Figure 1A:
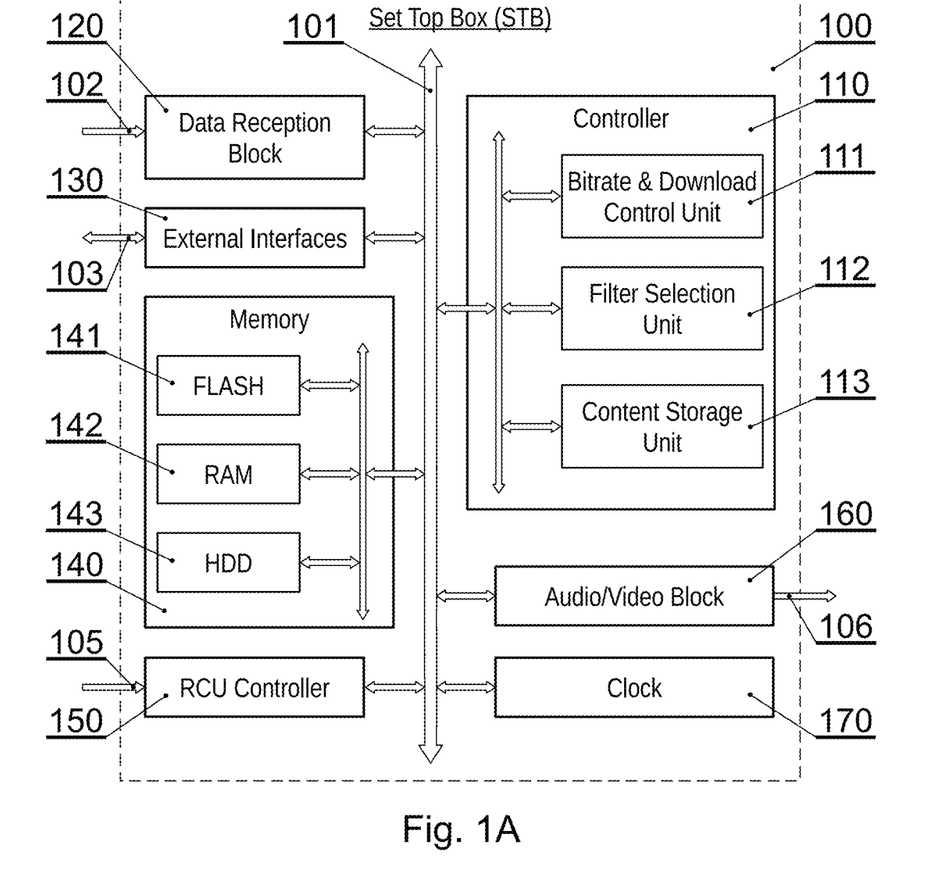
FIGS. 1A and 1B present a diagram of a receiver implementing a method according to the present invention, FIG. 1A focuses on STB components and FIG. 1B on data reception flow.
Figure 1B:
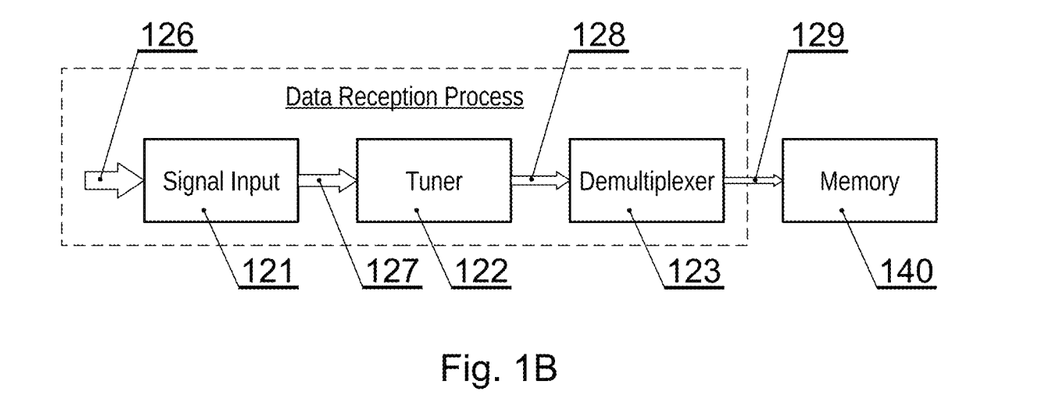

The aforementioned principles will be shown in the following figures. FIGS. 1A and 1B focus on STB components (1A) and data reception flow (1B). The invention is targeted for any device (100) compromising a Data Reception Block (120) such as a broadcast signal reception block (e.g. terrestrial, satellite), External interfaces (130) (such as optional USB interfaces), a Memory (140) and its types (FLASH 141, RAM 142, HDD 143), an RCU controller (150), A/V block (160) (outputting signals such as video and audio output), a Clock (170). The elements are connected by a data bus (101). The aforementioned are typical components of a set-top box.

When a data reception flow is taken into account, the following parts of filtering information are taken into applied: Signal Input (121) (the received signal which is broadcast 126), such as a broadcast signal comprising a carousel-like data structure), a Tuner (122), a Demultiplexer (123), the Memory (140) and a Controller (110).

Figure 7:
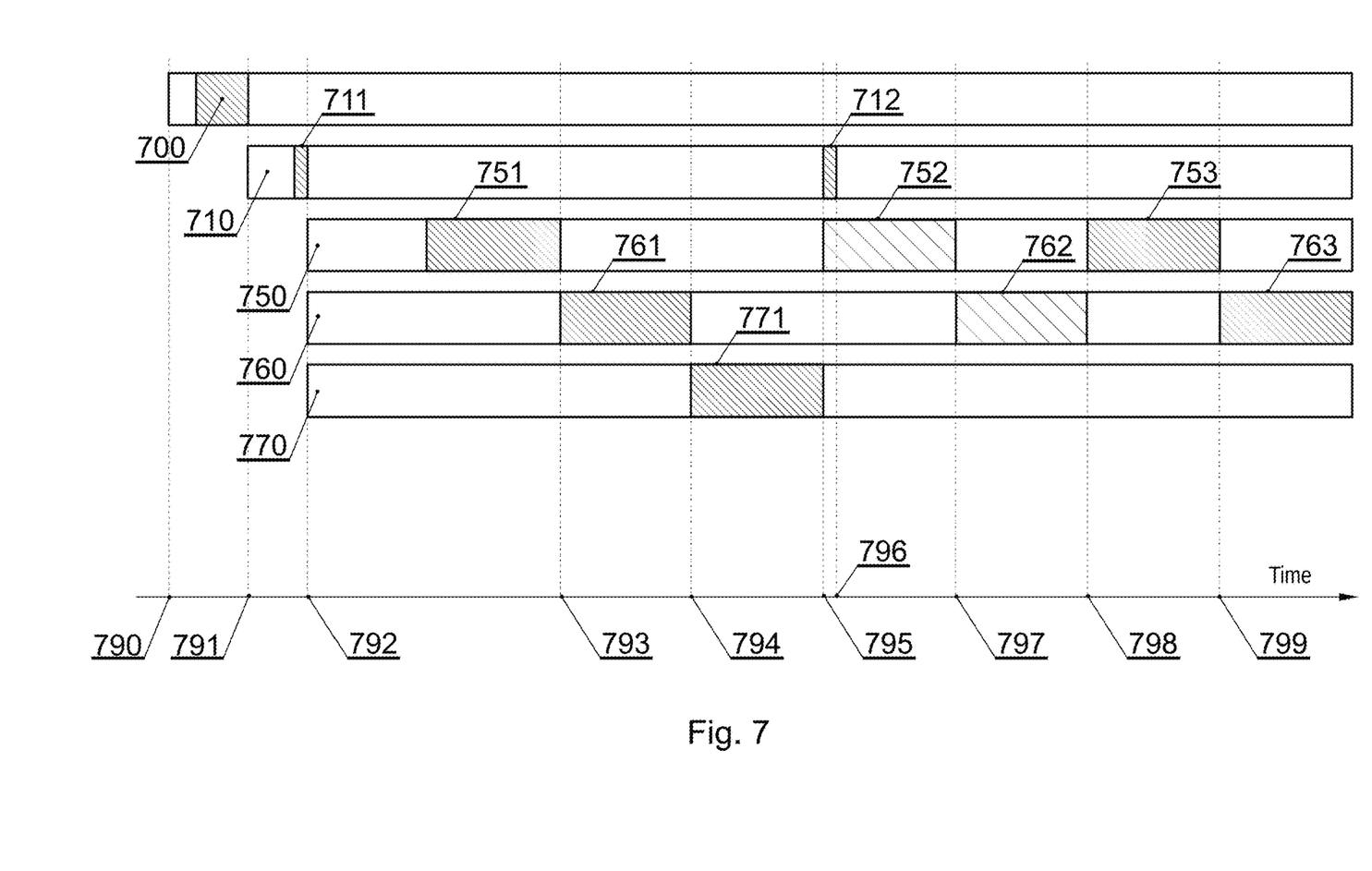
FIG. 7 depicts an example of resolving a situation when a bandwidth threshold is reached.

The controller (110) comprises a Bitrate and Download Unit (111), a Filter Selection Unit (112) and a Content Storage Unit (113). The Bitrate and Download Unit (111) is responsible for a process of collecting data and managing the download pace (as shown in FIG. 7). The Filter Selection Unit (112) is responsible for setting up the demultiplexer to pick sections up from the selected transport stream to the Memory (140). The Content Storage Unit (113) stores, in temporary storage, data received from the Filter Selection Unit (112) and guards data consistency (e.g. by calculating and verifying a checksum).

A signal (126) is received on a signal input module (121) and forwarded (127) to a tuner (122). The tuner (122) narrows down the information to one frequency and converts the signal from an analogue signal (127) to a digital signal (128). A digital Transport stream (128) is delivered to a demultiplexer (123) and a selectively output (129) to the memory (140). The received data are filtered at each level of processing.

Figure 2:
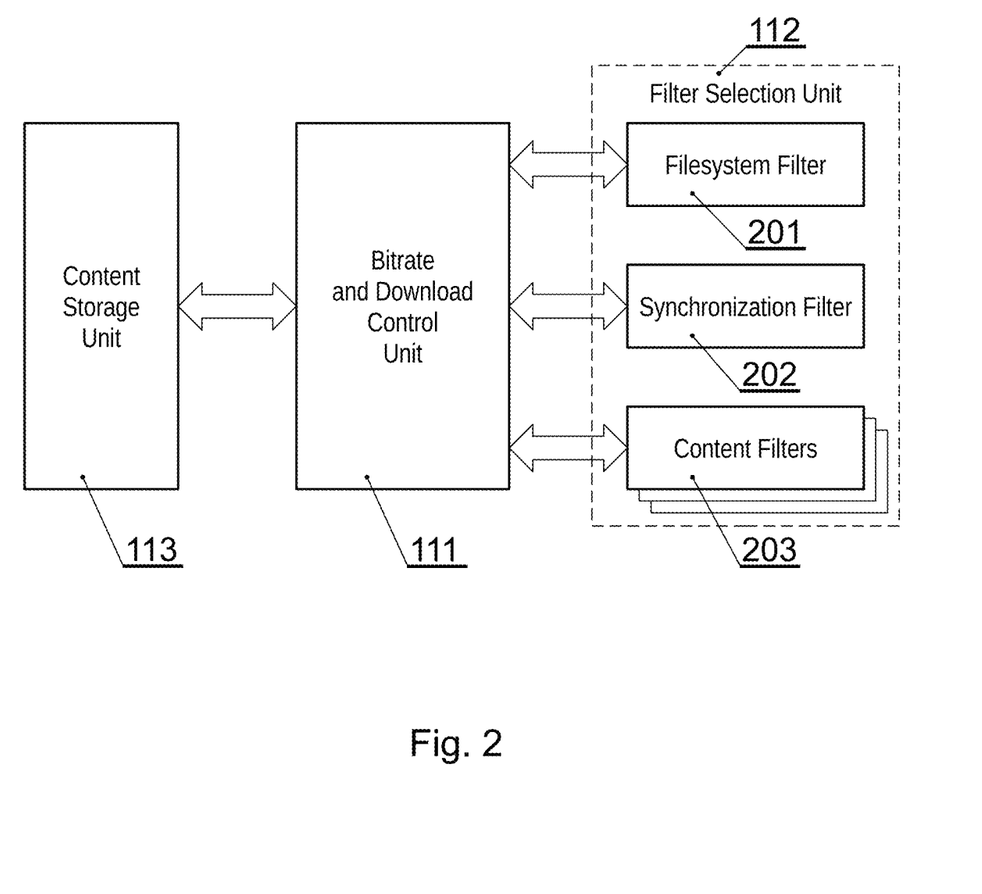
FIG. 2 presents a block diagram of a data processing path.

FIG. 2 shows data exchange between the modules of the system as well as details of the Filter selection Unit (112). Such modules may be realized using dedicated components or custom made FPGA or ASIC circuits.

The main component of the invention is said Bitrate and Download Unit (111), that controls the Filter Selection Unit (112), a synchronization filter (202), and a set of content filters (203). The data received by content filters are stored in the Content Storage Unit (113). The Bitrate and Download Unit (111) is responsible for keeping the broadcast data and the content storage consistent (e.g. by checking checksum, comparing versions).

The Filter Selection Unit (112) keeps monitoring the current version of the filesystem and notifies the Bitrate and Download Unit (111) about the changes in the filesystem (any updates to the filesystem content is signalled by a new version of a specific table). Whereas the synchronization filter (202) generates a synchronization triggers for the Bitrate and Download Unit (111) (e.g. the triggers may be set to every n-th data section; after section analysis, its address is established and based on that as well as the synchronization settings, subsequent addresses for retrieval are established). A set of content filters (203) is responsible for collecting particular sections or chunks and delivering data to the Bitrate and Download Unit (111).

Figure 3:
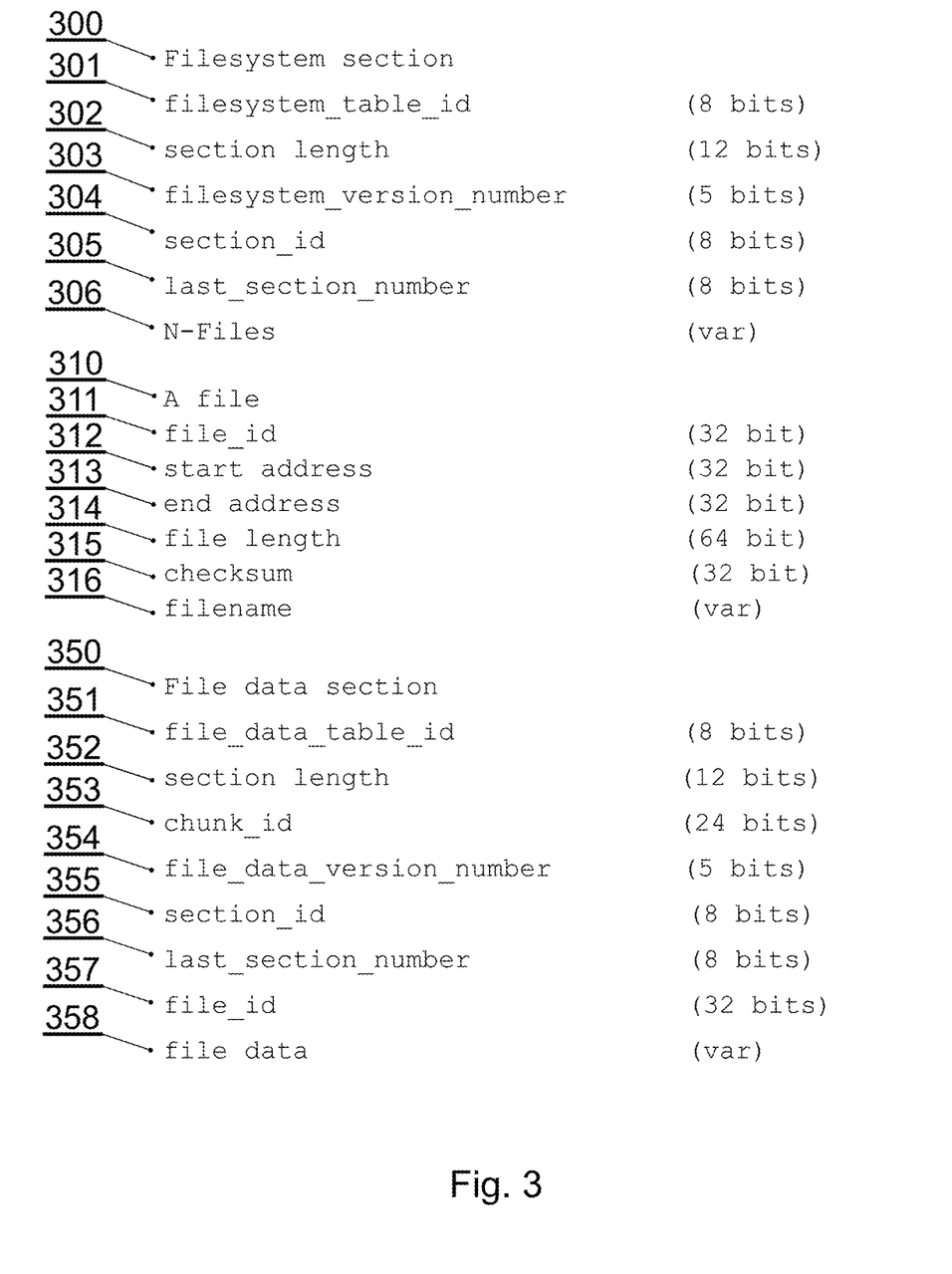
FIG. 3 presents a filesystem structures.

FIG. 3 presents an example of carousel data organisation. The starting points of the data organisation are special tables that may be delivered to a receiver in a variety of methods whereas a preferred delivery method is in a form of DVB Private Data Tables (PDT). SI table mechanism may be employed for carrying data as per ETSI EN 300 468.

According to the present invention, a filesystem table (300) is present whereas files data is carried by a files table (350). These tables are newly defined for the purpose of carousel data transmission and retrieval.

The filesystem table (300) comprises a filesystem table identifier [8 bits] (301) that is used to differentiate between DVB tables e.g. filesystems carried in transport streams, a section length [12 bits] (302) which specifies the number of bytes of the section, a filesystem version number [5 bits] (303) which is used in a receiver to identify whether a change has occurred in with respect to the version stored in the receiver, a section identifier [8 bits] (304) applied in distinguishing between sections, a last section number [8 bits] (305) denoting a final section of a given filesystem table and a description of N-files [variable depends on the section length] (306).

Every file, described in the (306) field, is represented by a file structure table (310), which comprises a file identifier [32 bit] (311) that is used to differentiate between files, a [32 bit] (312) and end [32 bit] (313) address denoting which sections have to be retrieved in order to obtain complete file data (the address space is linear and therefore all sections, between the addresses given, will be used), a file length [64 bit] (314) value, a checksum [32 bit] (315) as well as a filename [variable depends on the filename length (first byte in the filename)] (316).

Each file's (310) content information (350) structure comprises a file data table identifier [8 bits] (351) allowing to differentiate between file data tables, a section length [12 bits] (352), a chunk identifier [24 bits] (353), a file data version number [5 bits] (354), a section identifier [8 bits] (355), a last section number (356), a file identifier [32 bits] (357) (this is the same identifier as 311 for the purpose of linking the structures together), content of a file [variable depends on descriptor length] (358).

A section address is calculated as follows:

$$section\_address = chunk\_id * 256 + section\_id;$$

There is made an assumption that a file identifier may refer to one file only of a given version. Thus, when a file is modified, a new file identifier shall be assigned. Further, a file_data_version_number shall equal a filesystem_version_ number in order to be assigned to a given filesystem.

It is to be noted that specifically given sizes of the respective fields, depend on implementation and may be different.

Figure 4:
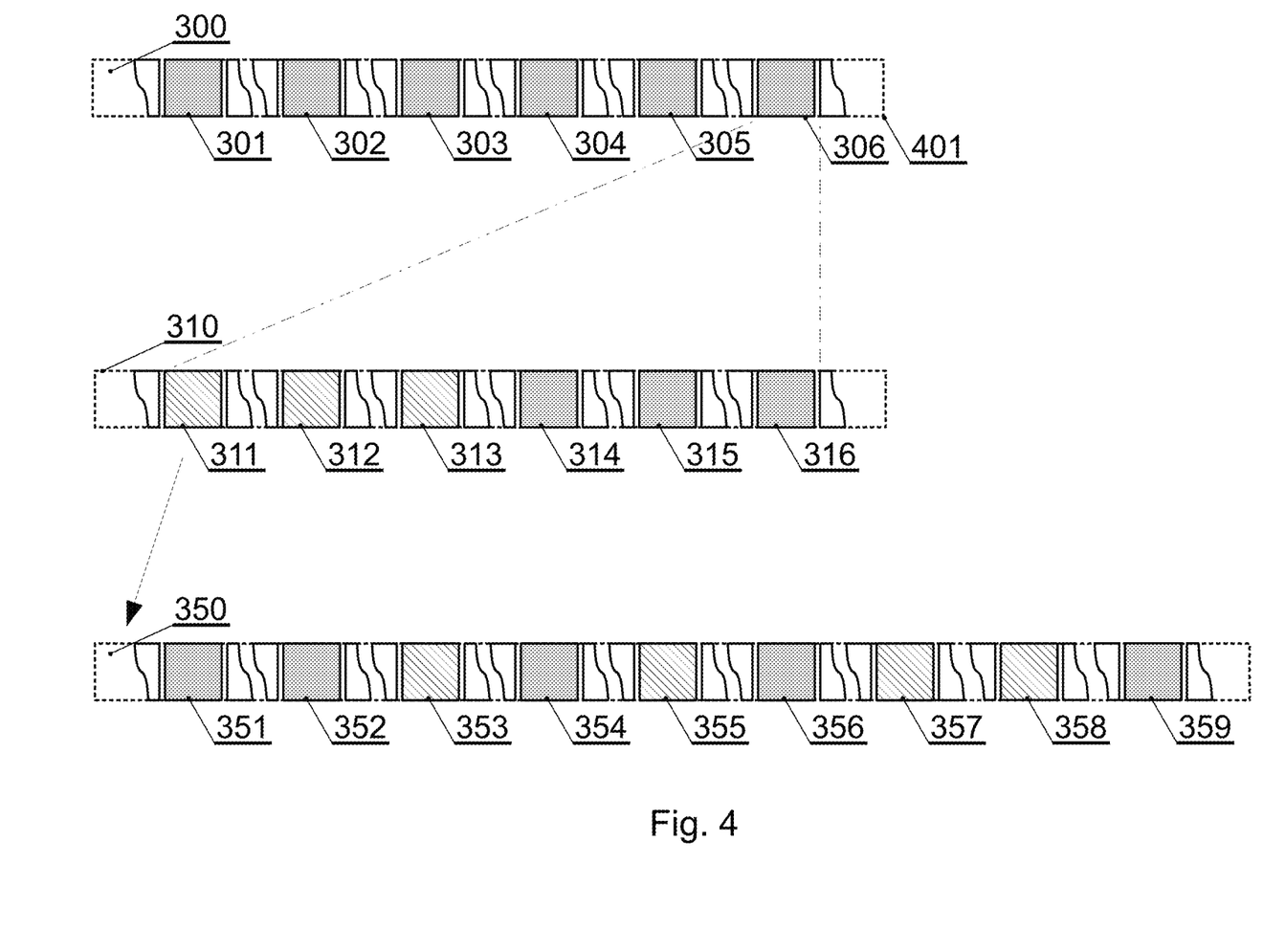
FIG. 4 shows a graphical representation of a filesystem carried by a data carousel.

A definition of a filesystem described with the descriptors of FIG. 3 has been presented in FIG. 4 in a graphical, hierarchical form. Items 401 denote other data that may or may not by interleaved between the data fields defined with reference to FIG. 3.

A process of downloading a filesystem table (300) is initiated by opening (490) a filesytem table (300) filter (201). After catching a synchronization, a set of content filters (203) is open to download data carried by a corresponding content information (350) structure.

Figure 5:
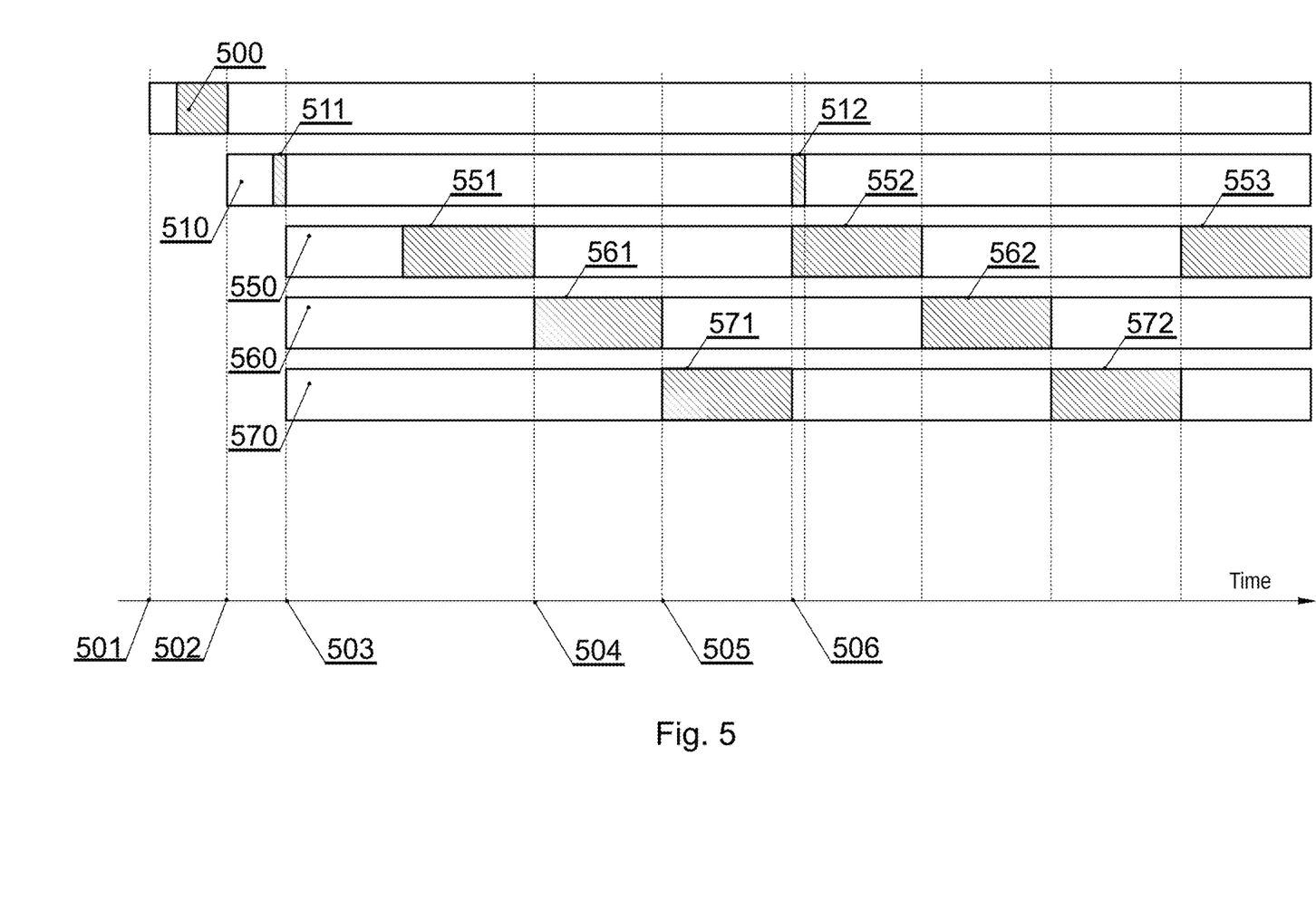
FIG. 5 depicts a timing diagram of a filesystem retrieval from a data carousel.

FIG. 5 presents a timing diagram of a method for downloading data from a carousel, using content filters. This process is initiated by opening (501) a filesytem table (300) filter (201). After collecting filesystem information, a delta is determined between addresses of already downloaded sections and addresses requested to be downloaded.

The Bitrate and Download Unit (111) may be requested to download a limited number of chunks or to download all the content of a given carousel. When the delta is known, the synchronization filter (202, 510) is opened (502).

Data items (511) and (512) are data structures (350), which have been received by the synchronization filter (202).

After catching the synchronization (503) (a synchronization is determination of a next address to download. Depending on a current state of the reception system), a set of content filters (203, 550, 560, 570) is open to download data. Each content filter (203, 550, 560, 570) is opened to download consecutive sections at consecutive addresses (551, 561, 571) starting at the next address from the section caught during synchronization. Similarly, further sections (552, 562, 572, 553) are retrieved.

After catching all sections associated with a given chunk (504, 505, 506), the content filter (550) is rescheduled to download the next chunk (552). The next chunk address is taken from the precomputed delta (based on known addresses, detected changes as well as data already downloaded) and the chunk is locked as long as the download of it is in progress. When an address of a chunk is locked, other content filters will not download the same sections.

When a new section arrives in the synchronization filter (112, 510), the filter notifies the bitrate and download control unit (111) and the control unit ensures that every content filter is not left behind the synchronization. In the boundary case when N chunks left are scheduled to be downloaded, and the N content filter are available, none of them has to be rescheduled.

A checksum may be verified after downloading a chunk or a file. In case when a chunk or a file is inconsistent, its download may be repeated.

The same verification mechanism may be applied to versions so that it does not matter which one will be the first broadcast. In the case, the filesystem table (300) is broadcast before the content (preferred), the delta to download will be determined and previous content filters will be closed and new ones opened. In another case, when content with a new version will be broadcast before a corresponding filesystem table (300), the content filters and synchronization will be stalled for a moment due to lack of data until a new filesystem table (300) has been caught and the synchronization and content filters will be set to a new version.

One of the important aspect is keeping consistency between versions of the filesystem and content data. When a version of the filesystem is changed, the appropriate version in the content sections needs to follow that change.

Figure 6:
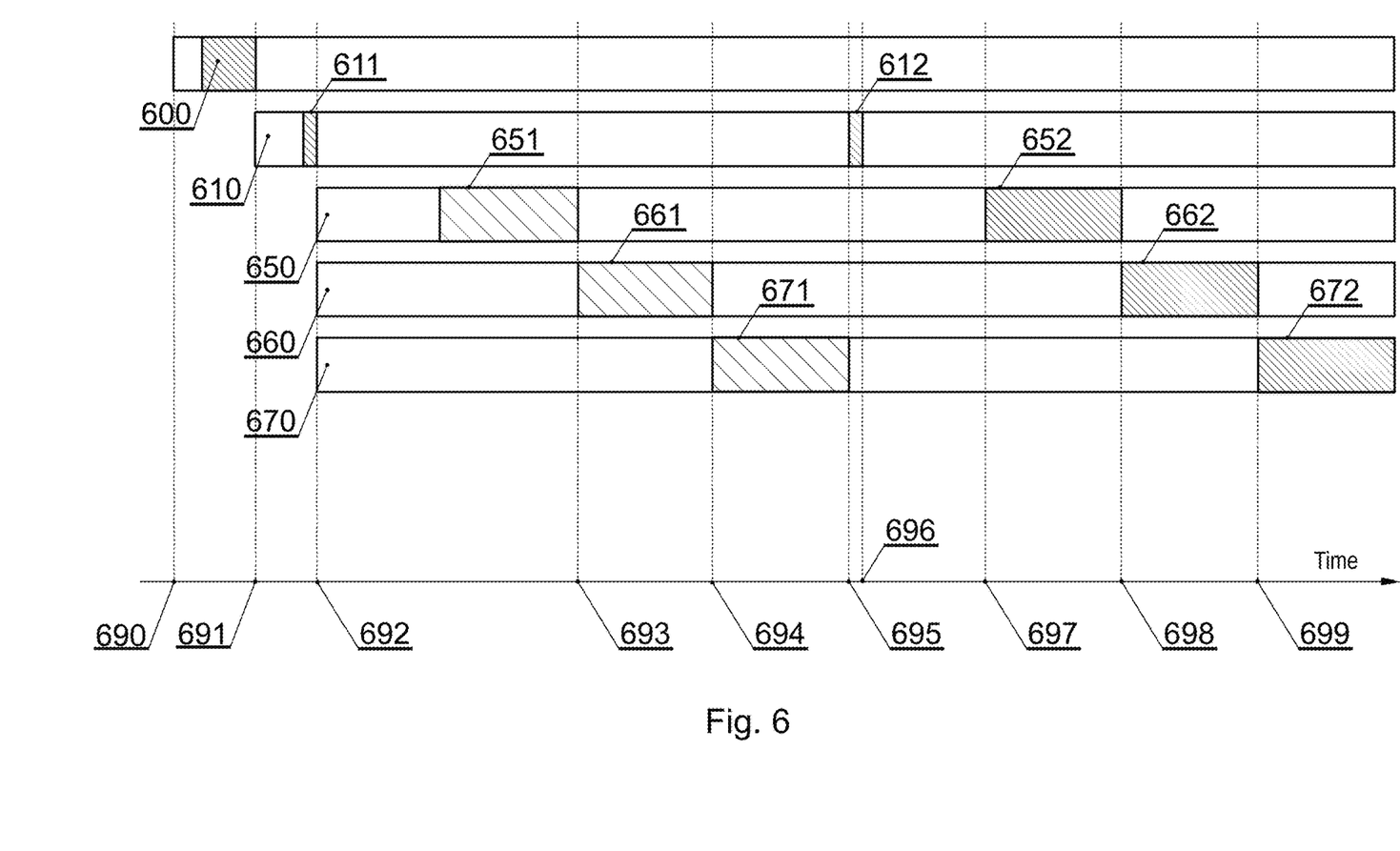
FIG. 6 depicts a scenario where, due to signal noise or distractions, content filters could not collect data.

FIG. 6. covers a scenario where, due to signal noise or distractions, content filters (650, 660, 670) could not collect data (651, 661, 671). The process starts in the similar way as described in FIG. 5. Firstly (690), the filesystem filter (601) collects the filesystem table (600) and when the operation is finished (691) a synchronization filter (610) is opened. After receiving synchronization (692) content filters (650, 660, 670) are opened. Due to a lack of signal sections (651, 661, 671) are not collected and new filters are opened (696, 697, 698, 699) in order to collect the missing data.

Data items (611) and (612) are data structures (350), which have been received by the synchronization filter (202).

When a synchronization 612 is received (696) the content filters are closed and a new set of filters is opened to download chunks (652, 662, 672). Without the synchronization (610) the chunks (651, 661, 671) will block the download of the chunks after (697).

FIG. 7 is an example of resolving a situation when a bandwidth threshold is reached. This scenario has a similar beginning as shown in FIGS. 5 and 6. First, a filesystem filter (701) is opened (790) to collect the latest version of the filesystem table. After downloading the filesystem table (791), a synchronization filter (710) is opened to catch the latest broadcast section address.

Data items (711) and (712) are data structures (350), which have been received by the synchronization filter (202).

When a synchronization is caught (792), content filters (770, 760, 770) are opened. After reaching a download bandwidth threshold (793), the content filter (770) is rescheduled to the nearest section address (773) that allows keeping download bandwidth below the threshold. The chunk (752) is skipped because if it will be downloaded the bandwidth threshold will be exceeded. The same rule applies for content filter (760), accordingly, after (794), the chunk (762) is skipped and the nearest available chunk that fits a planner is (763), so the filter is opened after (794) to collect the chunk (763).

Figure 8:
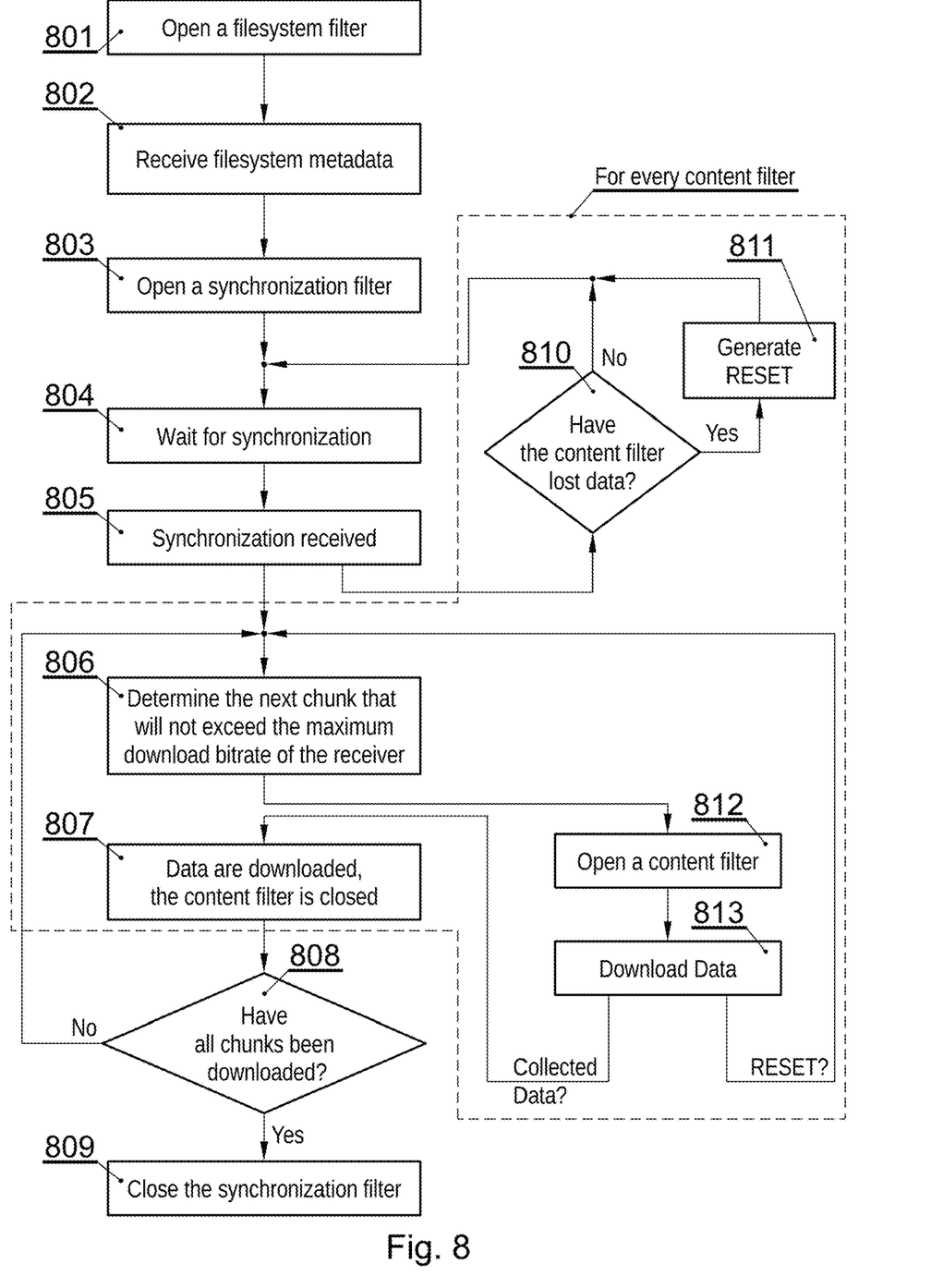
FIG. 8 presents a diagram of the method according to the present invention.

FIG. 8 presents a diagram of the method according to the present invention. The method facilitates downloading data, using the Bitrate and Download Unit (111), and starts at step (801) from opening a filesystem filter (opening a filter means that it is open to filter data and pass the caught data to a selected receiver. The filter is set at the demultiplexer (123) and here comprises an identifier of a filesystem table).

Subsequently, after downloading all sections (802) required to build a filesystem (this refers to all required metadata regarding a filesystem), transmitted in the broadcast data carousel, as well as a linear address space, the synchronization filter (202) is opened (803)) in order to determine sections addresses that are broadcast in the data carousel.

After catching a synchronization (804, 805) the next chunks are determined (806) (that will not exceed the maximum download bitrate of the receiver) and n-content filters are opened (812) in order to download the determined chunk (813), after which the filters are closed (807).

Next, after collecting all sections associated with the content filter (808), the Bitrate and Download Unit (111) checks for the next chunk to download (806). When all chunks are downloaded (808), the synchronization filter is closed (809). The filesystem filter may remain open to monitor if a new version of the filesystem is broadcast.

During the data download process (813) a reset signal may be called (810, 811), which means that the receiver has not received expected data and an error has occurred (810). In such a case the system returns to step (806) and determines the next proper chunk to download.

It is to be noted, that n content filters may operate in parallel (812, 813, 807). Each pf the n content filters is set to a different data range (different range of consecutive addresses). In case a given range is already being served by another filter, a new filter is applied to an uncovered range of addresses provided the maximum set bitrate is not exceeded. A download is executed according to organization shown in FIG. 5 where sections (551, 561 571) are subsequent sections covered by different content filters.

In case n equals 2 and high bitrates, less-capable receivers may find it impossible to manage content filters exchange and setup. Typically, n equal to 3 is used wherein n increases with a decrease of processing power (typically hardware since software filters are not efficient enough) of a receiver.

Using the aforementioned selective download leads to a reduction of operations in case when a broadcast signal is subject to interferences resulting in errors at the reception end. The reduced number of operations, as well as controlling the bitrate at the predefined rate, unlocks the memory transfers for other usage and reduces energy and time needed to complete data from a carousel. Therefore, the invention provides a useful, concrete and tangible result.

Considering a scenario where a legacy population of STBs is deployed in a field and a broadcaster wishes to increase a bitrate of a broadcast data carousel, to shorten content delivery time to the STB capable to deal with a higher bitrate, such broadcaster has to double the carousel data payload and provide two separate data carousels for the different STBs populations, because the legacy STBs population cannot deal with the higher bitrate streams. The presented invention removes these restrictions because every population can control the pace of the section's download.

When a broadcaster simultaneously transmits a data carousel on several transport streams and the carousel content is shifted between each stream, the download and bitrate control unit may open synchronization and content filters on each transport and supply needed sections to the content storage unit from multiple sources.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system".

Furthermore, the present invention may take the form of a computer program product embodied in any tangible medium of expression having computer usable program code embodied in the medium.

It can be easily recognized, by one skilled in the art, that the aforementioned method for improved, selective download of broadcast data may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A non-transitory computer readable medium storing computer-executable instructions, the instructions for executing on a computer a broadcast signal configured to facilitate selective download of broadcast data at a receiver, said broadcast signal comprising:
a filesystem table (300) comprising:
a filesystem table identifier (301) that is used to differentiate between tables;
a section length (302) which specifies the number of bytes of the section of the filesystem table (300);
a filesystem version number (303) which is used in the receiver to identify whether a change has occurred in with respect to a version stored in the receiver;
a section identifier (304) applied in distinguishing between filesystem table (300) sections;
a last section number (305) denoting a final section of a given filesystem table;
said signal being characterized in that the filesystem table (300) further comprises:
a description of N-files (306) wherein every file is represented by a file structure table (310), which comprises:
a file identifier (311) that is used to differentiate between files;
a start (312) and an end (313) address, in a linear address space, denoting which sections have to be retrieved in order to obtain complete file data;
a file length (314);
a checksum (315);
a filename (316);
wherein for each file structure table (310) a content information (350) structure is provided that comprises:
a file data table identifier (351) allowing to differentiate between file data tables;
a section length (352) of the content information (350) structure;
a chunk identifier (353) for grouping sections of the content information (350) structure;
a file data version number (354);
a section identifier (355);
a last section number (356) of the content information (350) structure;
the file identifier (357);
content of the file (358).

2. The signal according to claim 1 wherein the filesystem table (300) and the file structure table (310) and the content information (350) structure are delivered in a form of DVB Private Data Tables (PDT) while Service Information table mechanism is employed for carrying data as per ETSI EN 300 468.

3. The signal according to claim 1 wherein a section address is calculated as follows: section_address=chunk identifier*256 (353)+section identifier (355).

4. The signal according to claim 1 wherein each file identifier refers to one file only of a given version.

5. The signal according to claim 1 wherein further, a file data version number (354) shall equal a filesystem version number (303) in order to be assigned to a given filesystem.

6. The signal according to claim 1 wherein a chunk is composed of at least one section and a file comprises at least one chunk.

7. A method for receiving the signal according to claim 1 for facilitating selective download of broadcast carousel data at the receiver, said method being characterized in that it comprises the steps of:
configuring a filesystem filter (801) to collect an identified filesystem table (300);
subsequently, after downloading all sections (802) required to build a filesystem metadata comprising the filesystem table (300) and the file structure tables (310), configuring (803) a synchronization filter (202) in order to determine sections' addresses that are broadcast wherein a synchronization is a determination of an address of a next section to download;
after catching one of said synchronizations (804, 805) determining (806) the next chunks (806), that will not exceed a maximum download bitrate of the receiver, and configuring (812) n-content filters in order to download the determined next chunk (813), and closing said n-content filters (807) and after all chunks have been downloaded (808), closing the synchronization filter (809).

8. The method according to claim 7 further comprising a step of receiving, during the data download process (813), a reset signal (810, 811), which means that the receiver has not received expected data and an error has occurred, wherein in such a case returning the system to the determining step (806) and determining the next chunk to download.

9. A non-transitory computer readable medium storing computer-executable instructions performing all the steps of the computer-implemented method according to claim 7 when executed on a computer.

10. A system for receiving the signal according to claim 1 for facilitating selective download of broadcast data at the receiver, said system being characterized in that it comprises:
- a controller (110) comprising:
    - a Bitrate and Download Unit (111) configured to collect data and manage a download pace;
    - a Filter Selection Unit (112) configured to set up a broadcast signal demultiplexer to pick sections up from a selected transport stream to a Memory (140);
    - a Content Storage Unit (113) configured to store data received from the Filter Selection Unit (112) and guard data consistency;
- wherein said controller (110) is configured to execute all steps of the method according to claim 7.

* * * * *